United States Patent
Harris et al.

(10) Patent No.: US 7,792,765 B2
(45) Date of Patent: Sep. 7, 2010

(54) METHOD OF CONTROLLING THE OPERATION OF AN AUTOMATED POSTAGE METER

(75) Inventors: Steven E. Harris, Newport Beach, CA (US); Lawrence G. Marinelli, Lake Forest, CA (US)

(73) Assignee: Neopost Technologies, Bagneux (FR)

( * ) Notice: Subject to any disclaimer, the term of this patent is extended or adjusted under 35 U.S.C. 154(b) by 584 days.

(21) Appl. No.: 11/724,673

(22) Filed: Mar. 16, 2007

(65) Prior Publication Data

US 2008/0228669 A1   Sep. 18, 2008

(51) Int. Cl.
*G06F 17/00* (2006.01)
*G06F 12/14* (2006.01)
*G07B 17/02* (2006.01)

(52) U.S. Cl. .............. 705/408; 705/401; 705/404; 358/1.18

(58) Field of Classification Search .............. 705/4 X; 235/375
See application file for complete search history.

(56) References Cited

U.S. PATENT DOCUMENTS

| | | | | |
|---|---|---|---|---|
| 4,907,161 | A * | 3/1990 | Sansone et al. | 705/403 |
| 5,717,596 | A * | 2/1998 | Bernard et al. | 705/404 |
| 7,337,152 | B1 * | 2/2008 | Gawler | 705/401 |
| 2004/0054547 | A1 * | 3/2004 | Rozendaal et al. | 705/1 |
| 2004/0085580 | A1 * | 5/2004 | Kelleher et al. | 358/1.18 |
| 2005/0038759 | A1 * | 2/2005 | Kaye et al. | 705/408 |
| 2005/0189409 | A1 * | 9/2005 | Conard et al. | 235/375 |
| 2005/0216118 | A1 * | 9/2005 | Conard et al. | 700/223 |
| 2005/0228761 | A1 * | 10/2005 | Monsen et al. | 705/401 |
| 2005/0283449 | A1 * | 12/2005 | Jacobson et al. | 705/410 |
| 2006/0080266 | A1 * | 4/2006 | Kiani et al. | 705/402 |

* cited by examiner

*Primary Examiner*—John W Hayes
*Assistant Examiner*—Brian Epstein
(74) *Attorney, Agent, or Firm*—Townsend and Townsend and Crew LLP (57) ABSTRACT

Disclosed is an improved work-ahead method for efficiently operating a software-controlled, automated postage meter of the type used to print postage and other digital data on batches of mail that are run through the meter during successive jobs which originate from different accounts. The operator enters data relating to the parameters for a first job to be completed. After the meter is initialized and the meter overhead is encountered, the first batch of mail for the first job is run through the postage meter. As the first job is being executed and the first batch of mail is being imprinted with postage, the operator enters the data relating to the parameters for the next job. The operator then loads a second batch of mail for the next job into the postage meter. Provided that the first job has been completed, but without having to once again initialize the postage meter and encounter all of the meter overhead, the second batch of letters for the next job is now run through the meter. The postage meter is continuously readied to receive another batch of mail for a new job at the same time that the preceding job is being completed. Once the final job has been completed, meter information regarding all of the job transactions during the workday is retrieved, analyzed, displayed and saved.

20 Claims, 5 Drawing Sheets

METHOD OF CONTROLLING THE OPERATION OF AN AUTOMATED POSTAGE METER

BACKGROUND OF THE INVENTION

1. Field of the Invention

This invention relates to a work-ahead method for improving the productivity and efficiency of a remotely-controlled, automated postage meter of the type used to print postage and other digital data on successive batches of mail (e.g., letters, flats, packages, and the like) that are to be continuously fed through the meter at high speed to complete one job after another without having to stop meter between jobs.

2. Background Art

Postage meters have been used around the world to imprint on a piece of mail a postage corresponding to an amount that is prepaid to the postal service of a country. The majority of postal services now require certain digital information to be printed on the mail along with the requisite postage. To meet the requirement of printing digital data, modern postage meters have changed earlier printing technology from a rotary type to an ink jet printing process.

In many large government agencies, schools and businesses, postage is applied to outgoing mail one batch at a time with each batch originating from a different department. In this manner, each department can be accurately charged with the correct amount it has expended on postage. A significant problem with the current digital printing technology is that a large amount of time is wasted between the end of one job during which postage is imprinted on a first batch of mail from a first department and the beginning of the next job for imprinting the postage on a second batch of mail from a different department. That is to say, a delay is introduced from finishing the overhead for the first job to starting the next job.

More particularly, it is common for operators of remotely (i.e., software) controlled, automated postage meters after completing a first job run to change the postage meter parameters before starting a second job run. Such parameters often include the postal class to be affixed, the postage rate, accounting information to identify the party whose account will be charged, the date, advertising text, etc. When these parameters are changed prior to running the next job, the postage meter and its operator stand idly by such that the meter is unavailable to process the next batch of mail until the print head overhead tasks for the preceding job have first been completed. When many batches of mail are to be processed during successive job runs, a significant overall time is wasted for the postage meter to complete its respective overhead tasks from one job run to the next.

SUMMARY OF THE INVENTION

In general terms, this invention relates to an improved work-ahead method for controlling the operation of an automated, software-controlled postage meter so that the productivity and efficiency of operation can be increased throughout the workday relative to conventional methods. By virtue of the foregoing, batches of mail to be imprinted with postage and other digital data can be run through the meter during successive jobs in a shorter time and with less wear to the motor of the meter. More particularly, the postage meter motor need not be stopped after each job but runs continuously as different batches of mail are processed through the meter from one job to the next so as to avoid having to undergo a start and stop cycle and print head overhead tasks as one job is ended and a new job begins, as is otherwise common to conventional methods for controlling a postage meter. According to the preferred embodiment, one batch of mail to be imprinted with postage during a first job is loaded into the feeder of the postage meter. The operator initializes the meter by sending software commands to set the meter parameters. Such parameters to be set include the mail class, the current postage rate, rate engine format, and rate engine destination. The meter overhead is now started for the first job, whereby the print heads are unparked and cleaned, the motor of the meter and the meter feeder are started. As an important aspect of the improved work-ahead method herein disclosed, the foregoing initialization steps are only executed once regardless of the number of batches of mail to be run through the postage meter during successive jobs.

To achieve the aforementioned advantages, while the batch of mail from one job is passing through the postage meter to be imprinted with postage, the operator is entering the parameters for the next job. That is to say, the operator does not stand idly by and watch as a batch of mail runs through the meter. Once the first job has been completed, the operator loads the meter with the batch of mail for the next job to ensure continuous meter operation without issuing a stop command. The next job may be one of a series of jobs from a list to be completed during the workday. The operator can edit the list so that the jobs to be run through the postage meter will be prioritized. Once the last job has been completed, a stop command is finally issued and meter transaction data for all of the jobs is collected, analyzed and stored so that an accounting is available (i.e., displayed) of the total number of pieces posted and the total postage applied. Accordingly, the source of each batch of mail can be charged for the postage expended to complete its particular job run.

DESCRIPTION OF THE PREFERRED EMBODIMENT

Figure 1:
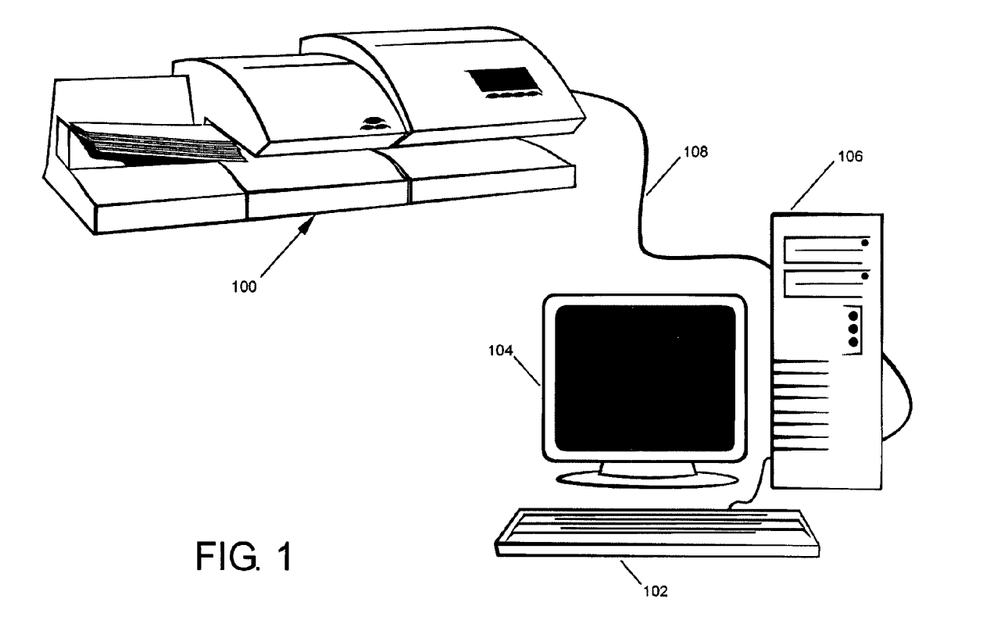
FIG. 1 is illustrative of a software-controlled, automated postage meter of the type to which the improved work-ahead method of the present invention is applicable.

A description is provided of the standard method that is employed to initialize an automated, remotely-controlled postage meter before running a first job of a series of jobs during which postage is imprinted on successive batches of mail (e.g., letters, flats, packages, etc.) which originate from different sources (e.g., departments) to be run through the meter. One suitable postage meter 100 contemplated herein is illustrated at FIG. 1 of the drawings. Such postage meter is a software-controlled meter that has been approved by the postal service of a country in which the meter will be used. However, it is to be understood that this invention is not limited to the postage meter 100 illustrated at FIG. 1, and any other suitable automated postage meter may be used herein.

By way of example only, a postage meter like that shown in FIG. 1 is manufactured by Hasler Mailing Systems, Inc. under Model No. WJ250. The illustrated postage meter 100 includes a keyboard 102, a (e.g., touch screen) monitor 104, and a computer 106 or similar computing device interfaced with the postage meter by an (e.g., RS232) connection 108 to enable the postage meter to communicate with the computer 106. In this same regard, it is also to be understood that the precise postage meter and its accessories to which the improved method is applicable form no part of the present invention. Thus, instead of a stand alone device as shown, the computer can be an onboard processor embedded within the postage meter. Moreover, the postage meter may be remote from the computer and communicate therewith via the internet, an ethernet link, etc.

Figure 2A:
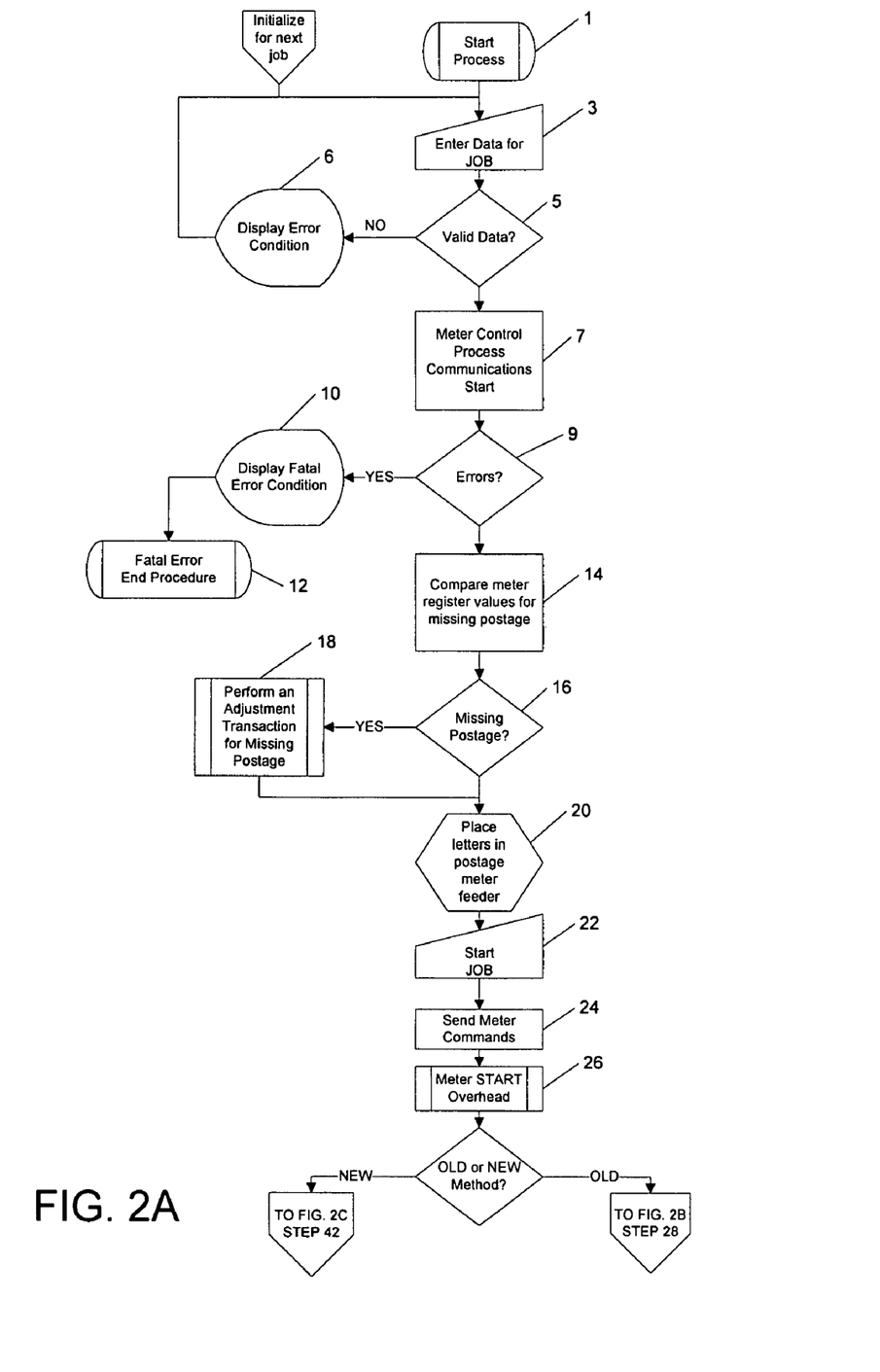
FIG. 2A illustrates the steps for initializing the postage meter of FIG. 1 at start-up for each of the conventional and improved work-ahead control methods.

Referring to FIG. 2A of the drawings, at the start 1 of the standard postage meter initialization process for a first batch of letters to be processed and imprinted with postage, the control software is accessed and the interface of the software to the postage meter is verified. In order to process the batch of letters for the first job, the operator enters the job parameters 3. Such parameters can include an account number against which the postage charges will be made, the postal class associated with the mail, the date of posting, the motor speed, the meter weighing accuracy, the content of any (e.g., advertising) text to be printed with the postage, etc.

Next, during a validation step 5, the software verifies the parameter data that was entered during the previous step 3. For example, the software verifies that the account number to be charged is a valid number, that there is a sufficient budget available to cover the postage charges for the first job, and that there are no restrictions against charging the designated account for the postage charges that will accrue when the first batch of mail is run through the meter to complete the first job. If any of the data cannot be validated, the corresponding error is displayed 6 on the monitor (designated 104 in FIG. 1) and the job parameters are entered again.

Once the operator entries are validated, the software loaded into the computer (designated 106 in FIG. 1) takes control of the postage meter operation 7. The software first verifies that the postage meter is ready to receive software commands and the previously entered data. If so, a wake-up command is sent to the meter. At the same time, the dynamic weighing platform (if connected for non-identical pieces of mail) is initialized, the meter batch registers are reset, and the meter register value and serial number are read.

After the software has readied the postage meter to receive the first batch run for the first job, an error-detection step 9 is completed to ensure that all preliminary steps have been successfully completed. Should an error be detected, an indication thereof is displayed 12 on the monitor. If the error cannot be corrected, the job is prematurely terminated 12 before the first batch of letters is run through the meter.

Provided that no error has been detected, the software completes a postage meter misuse routine 14 to determine if offline postage has been misappropriated (e.g., during the night or outside of normal business hours) by one who has no authority to use the postage meter for his personal benefit. That is, a comparison is made between the meter register valve at the conclusion of one job with the meter register value at the beginning of the next job. A determination is made 16 (depending upon the difference, if any, between the meter register valves at successive jobs) to discover whether postage is missing. If missing postage is detected during step 16, the operator is notified (of a potential misuse of offline postage), and the software makes an adjustment 18 to account for this difference in the online postage meter readings. After the adjustment has been made, or if no missing postage has been detected, the postage meter is now ready to accept the batch of letters for the first job to receive a postage imprint.

Accordingly, the batch of letters for the first job is loaded 20 into the feeder of the postage meter. The operator starts the first job 22 so that the postage meter will be ready to process and apply (i.e., print) the appropriate postage at high speed to each of the letters of the first batch. The operator has the option of setting a weigh-in motion mode (when the letters for the first job are of different weights) or an identical piece mode (when all of the letters are of identical weight).

When the job begins, the appropriate meter control commands are sent electronically 24 to the postage meter. Such commands can, to name but a few, set the mail class, set the current postage rate, set the weight, set the weight engine format and destination, clear the mail piece memory for a new run, and start the franking cycles. After the meter commands have been sent, the postage meter completes its internal mechanical overhead requirements 26 so as to be set to process the batch of letters for the first job. By way of example, the meter print heads are unparked and cleaned, an internal diagnostic program is run, and the motor and feeder of the meter are started.

The initialization of the postage meter has now been completed. A description of the conventional method that has heretofore been employed for controlling the operation of an automated postage meter continues while referring to FIG. 2B of the drawings.

With the motor and feeder of the postage meter running, all of the letters that have been loaded into the meter feeder for the first job are run through the meter 28. The time to complete the first job will depend upon the number of letters in the meter feeder. Once the postage, date and any other designated text have been applied to each letter, the posted batch of letters is moved into the exit hopper of the meter for deposit with the postal service. However, as a significant disadvantage of the conventional method of FIG. 2B, during step 28, when the letters are being imprinted with postage and loaded into the exit hopper, the operator simply stands idly by and watches while he waits for the first job run to be completed.

Figure 2B:
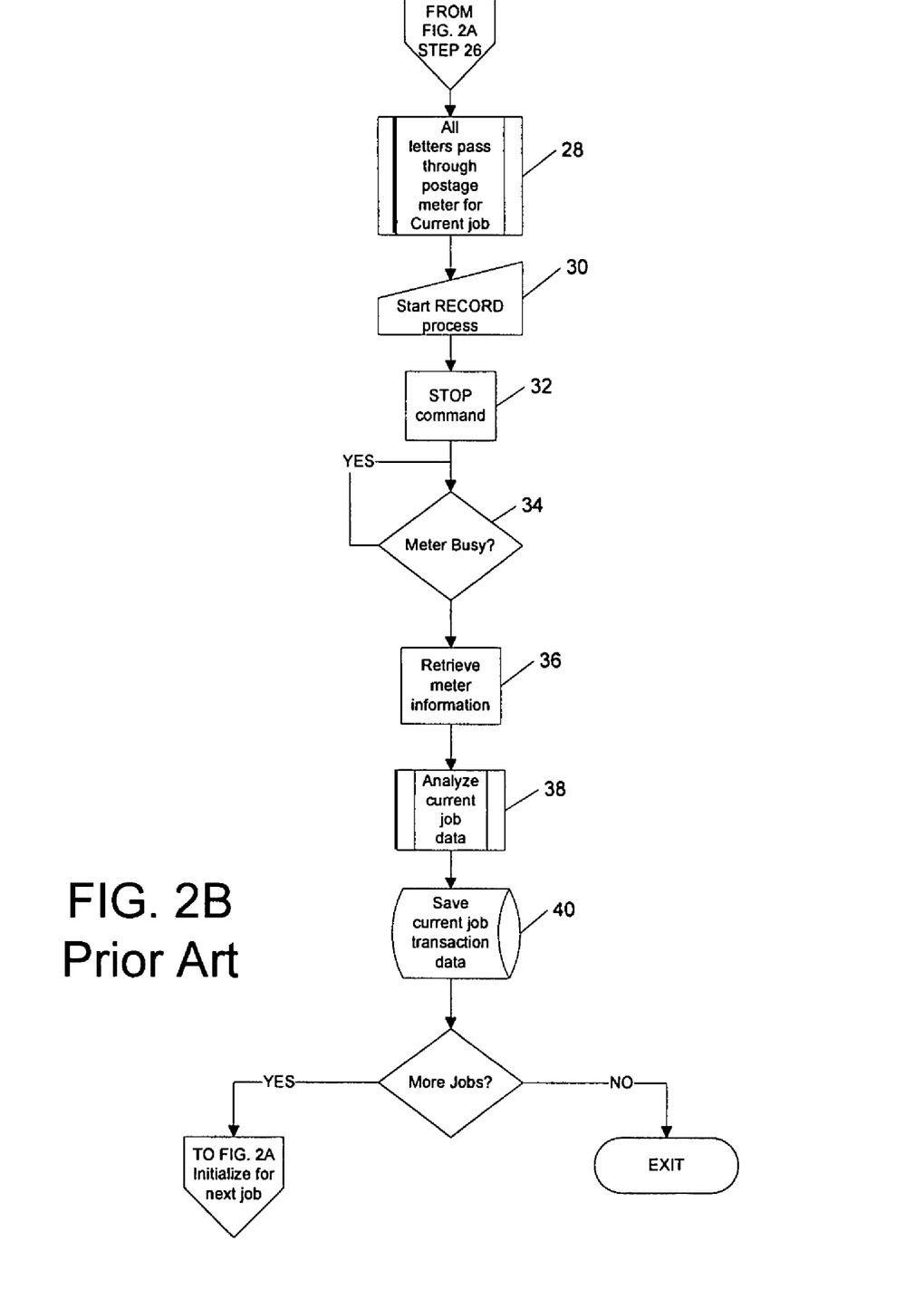
FIG. 2B illustrates the steps for the conventional method of controlling the operation of the postage meter shown in FIG. 1 after initialization.

When the first job run has been completed, the operator depresses the record button 30. A record of the total number of pieces of mail processed during the first job and the total postage affixed to the batch of mail is recorded by the software. The job of imprinting the batch of letters for the first job is now complete, whereby the operator initiates a stop command 32 to be issued by the software.

Prior to running the next (i.e., second) job for the next batch of letters, certain meter information is collected for analysis. That is, register values are recorded as each letter moves through the postage meter between the feed and exit hopper thereof. A determination 34 is made whether the meter is currently busy. If the meter is available, the meter values are retrieved 36 for display. Such meter values typically include an ascending register value, a descending register value, and an indication of the total number of pieces that have been processed during the job.

The meter register values that were retrieved during the prior step 36 are analyzed 38 so that a calculation can be made as to the total postage that has been applied to the batch of letters during the first job. As part of this analysis, the reliability of the retrieved information is investigated. That is, algorithms are used to identify any discrepancies between the actual value of the postage applied and the value that has been recorded so as to account for all of the postage that has been imprinted on the batch of letters during the first job. To accomplish the foregoing, a check is made whether a message was sent (during step 36) and information recorded corresponding to each letter from the batch of letters that move through the postage meter during the first job. All of the transaction data collected during the first job is then saved 40 and charged to the appropriate account for whose benefit the first batch of letters will be mailed.

In the event that the job which was just completed is the only job or the last job of the workday, the postage meter will be shut down. However, should there be one or more additional jobs to be completed after the batch of letters is removed from the exit hopper of the postage meter at the end of the preceding (i.e., first) job for delivery into the custody of the postal service, the postage meter must once again be initialized before beginning the next (i.e., second) job for the next batch of letters to be run through the postage meter to be imprinted with postage. In this regard, it should be appreciated that in order to complete the next and succeeding jobs for printing postage on different batches of letters originating from different sources to be charged to correspondingly different accounts, all of the initialization steps illustrated in FIG. 2A that were previously completed during the first job must be repeated. In particular, all of the overhead associated with the first job (during step 26) is once again encountered. What is more, additional operator time is wasted (during step 28 of FIG. 2B) as he remains at rest during the batch processing through the postage meter. Moreover, meter time is wasted (after step 32 of FIG. 2B) when a stop command is executed at the end of each job run and a separate accounting is compiled on a job-by-job basis. Consequently, the posting process becomes highly inefficient, especially when many batches of mail must be imprinted for a large number of job runs and charged to many different accounts during the workday.

Figure 2C:
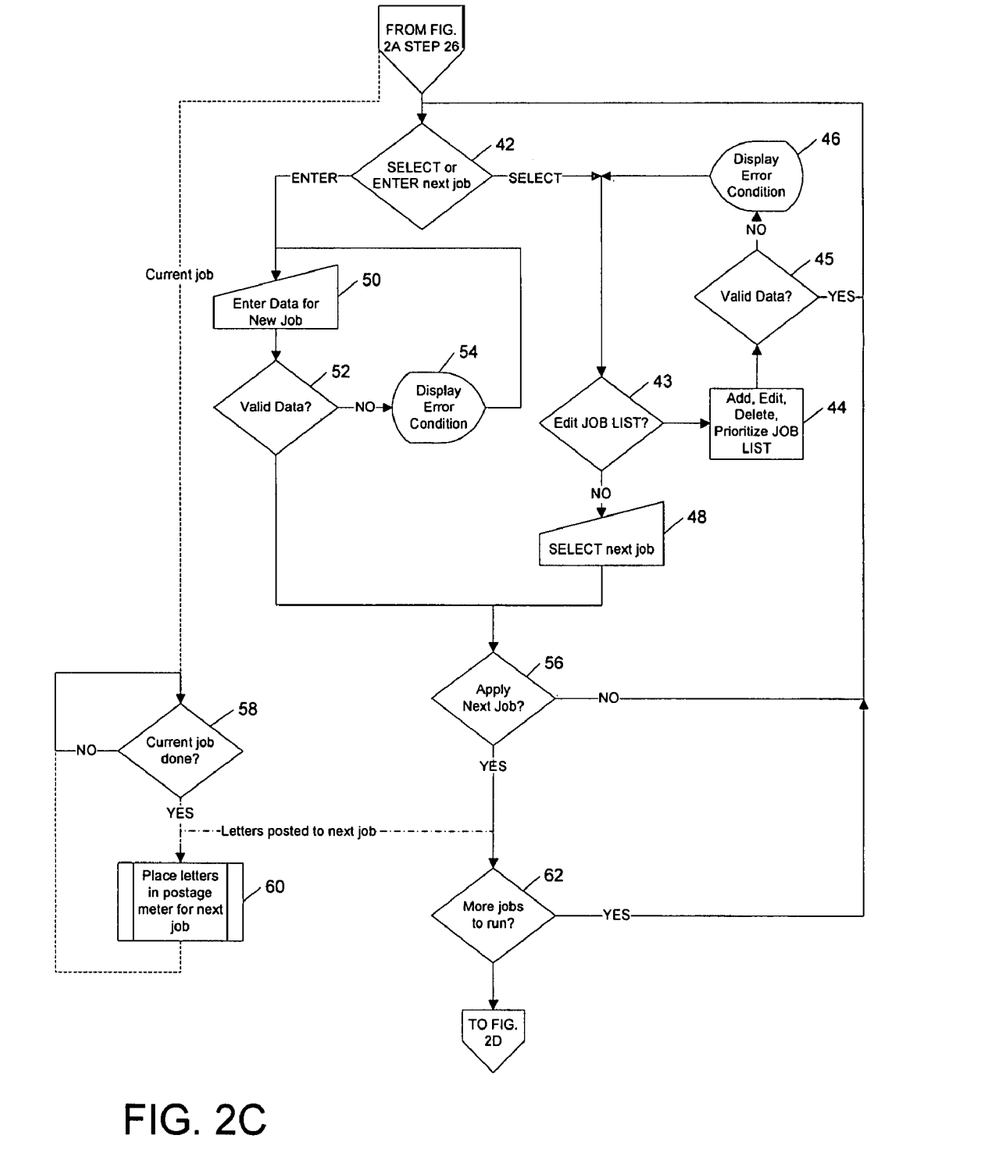
FIGS. 2C and 2D are illustrative of the steps of the improved work-ahead method according to a preferred embodiment of the present invention for controlling the operation of the automated postage meter of FIG. 1 after initialization so as to increase the efficiency and productivity thereof.

Turning now to FIG. 2C of the drawings, an improved, continuous work-ahead method is disclosed for the software control of an electronic, software-controlled postage meter 100 like that shown in FIG. 1 where both efficiency and productivity are improved relative to the conventional method represented by FIG. 2B. In the improved work-ahead method, the postage meter must still be initialized. Therefore, all of the initialization steps illustrated in FIG. 2A are completed at start-up. However, unlike the conventional control method illustrated in FIG. 2B, the postage meter is only initialized once for the first job, rather than subjected to repeated initializations following each job of a plurality of jobs. At the conclusion of initialization step 26 of FIG. 2A, the improved work-ahead method continues at FIG. 2C.

The work-ahead method of FIG. 2C proceeds along two parallel paths which are performed simultaneously so as to allow one job to run at the same time that the meter is being set up for the next job or a series of jobs to be performed one after the other. More particularly, all of the letters from the batch of mail from the current job are now moving through the postage meter. Instead of wasting time by watching and doing nothing as the letters from the current job pass through the meter, as in the case of the conventional postage meter control method illustrated in FIG. 2B, the operator in the improved work-ahead method first decides 42 whether to prepare the postage meter to accept the next job or a list of jobs that are to be completed in a particular order. In the event that a new job will be performed following the conclusion of the current job, the operator enters the parameters 50 for the next job. Such parameters corresponding to the postage meter activity for the next job may include entering the account number to be charged for the postage dispensed during the next job, the class of mail, date, motor speed and weighing accuracy, and the content of any text to be printed with the postage.

The parameter data entered by the operator of the next job is validated 52. That is, the account number is verified, the budget is checked to ensure that a sufficient balance is available to cover the charges for the batch of letters to be posted, and any restrictions against making the charges against the designated account are determined. Any error condition is detected and displayed 54 to the operator.

Provided that no error condition has been detected 62 and provided that there is yet another new job to run 56, once the preceding job has been completed 58 and all of the letters have been run through the postage meter, the batch of letters for the next job is now loaded 60 into the meter feeder for posting. All of the letters to be posted for the new job are now run through the postage meter. The foregoing is advantageously completed without issuing a stop command at the conclusion of the preceding job as is otherwise the case (at step 32 of FIG. 2B) for the conventional method.

Should there still be yet another job to be completed 62 and without stopping the meter, the work-ahead method returns to steps 42 and 50 during which the operator enters the job parameters for the still-to-be-completed new job. In the event that the last job of the workday has finally been completed, and referring in this regard to FIG. 2D of the drawings, the operator presses the record button 64 to start the record process. A record is stored in the software indicating the total number of pieces in the combined batches of letters that are run through the meter during all jobs as well as the total postage applied thereto. The operator initiates a stop command 66 now that the final job has been completed and a cumulative job record is stored.

Figure 2D:
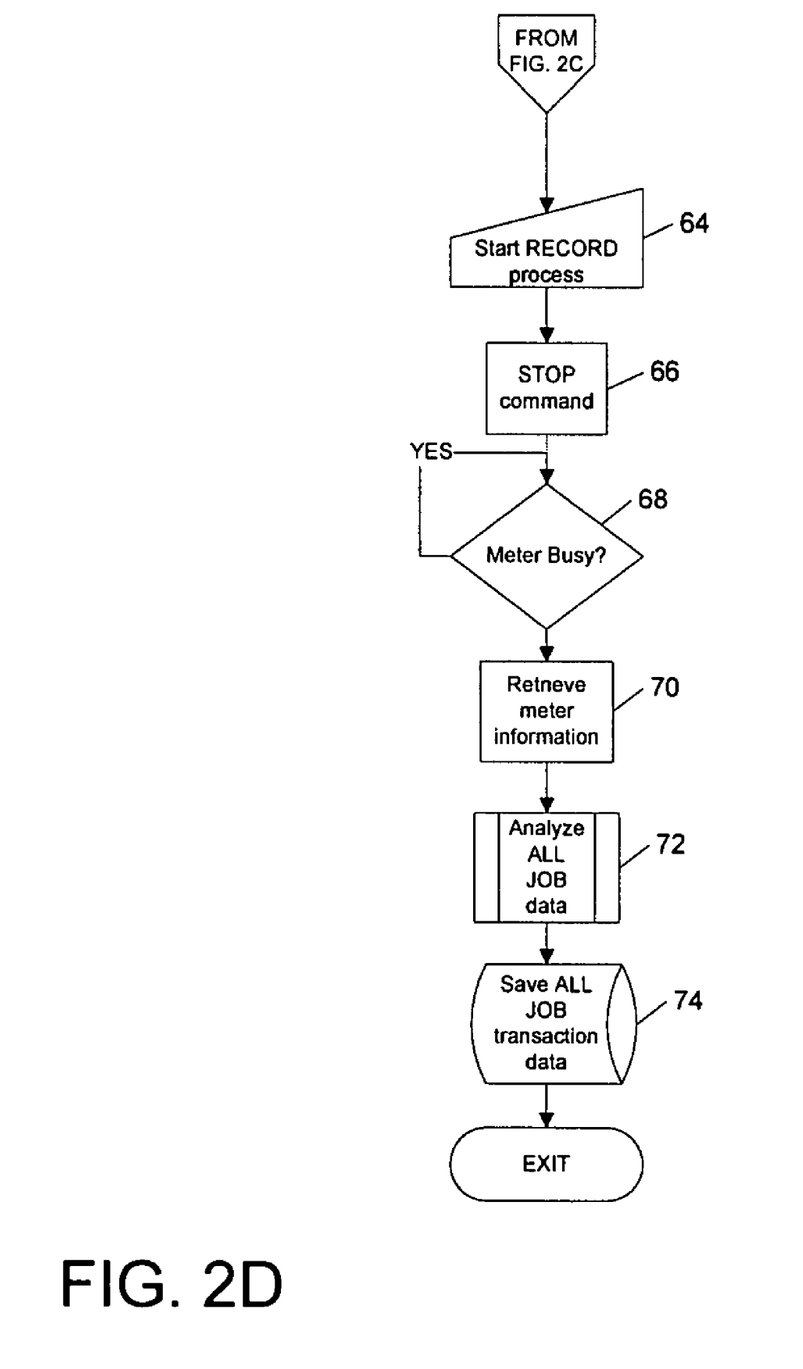

The cumulative meter information is collected for analysis to identify the amount of postage that has been applied to each of the batches of letters from different sources that are run through the postage meter during each job. If the meter is not currently busy 68, the meter values (e.g., ascending register value, descending register value, and the total number of letters processed during all of the jobs) are retrieved and displayed 70 for the operator.

The meter register values that are retrieved during the prior step 70 are analyzed 72 so that the total postage that is applied during all jobs is displayed. The reliability of the retrieved data is also investigated. That is, algorithms are used to identify any discrepancy between the actual value of postage that has been printed and the value that is recorded so as to account for all of the postage that has been applied during the workday. All of the transaction data collected during all of the jobs is then saved 74 and charged to the appropriate accounts for whose benefit the batches of letters will be mailed.

Returning now to step 42 of FIG. 2C, it may be that the operator has a list of jobs to complete during the workday. In this case, the operator enters into the computer 100 (of FIG. 1) the parameters for all of the jobs on the list according to job priority. Following entry, the operator may wish to edit the original list 43 by adding or deleting one or more jobs or changing the order (i.e., priority) in which the jobs will be completed 44. If the order of the jobs to be completed is changed, the list of job parameters is correspondingly changed in accordance with the revised list. Thus, different jobs will now be stacked in advance one after another while awaiting their respective run times. As in steps 52 and 54 previously described, the parameter data for the first job on the list is validated 45, and any error condition is detected and displayed 46 to the operator.

However, should the list of jobs not be in need of change so as to remain unedited at step 43, then the operator simply prepares the meter 48 to run the highest priority job on the list. By virtue of the foregoing, and as described while referring to steps 56, 58, 60 and 62, so long as there is another job on the list waiting to be completed, the operator need not stand idly by and wait for a prior job on the list to be completed before being able to enter the parameters for any or all of the remaining jobs. In this way, the postage meter can accept the mail for the next job on the list so as to begin the posting process as soon as the mail from the current job has received its postage.

Once the last job on the list has been completed, the postage meter will finally be ready to receive a stop command 66 at which time the transaction data from all of the completed jobs on the list will be saved as was described earlier while referring to FIG. 2D.

All of the jobs have now been completed, and the relevant postage data has been collected, analyzed and stored. However, by virtue of the work-ahead postage meter control method represented by FIGS. 2C and 2D, the internal and external overhead of the meter is advantageously skipped for the second (and any succeeding) job. In other words, the postage meter is only initialized at start up, and the meter commands (illustrated at step 24) need only be sent once for the first job. Moreover, the meter remains in a continuous, non-stop operating mode until all jobs have been completed, and the operator does not waste time between batch runs through the meter from one job to the next. Accordingly, job productivity and efficiency will be increased, while wear on the meter motor (not having to go through as many start and stop cycles) is advantageously reduced.

The invention claimed is:

1. A method for controlling the operation of an automated postage meter by a computing device, said method comprising the steps of:
    entering into the computing device parameters for imprinting postage on a first batch of mail to be run through the postage meter during a first job, said parameters including a class of mail, any text to be imprinted with the postage, a date, and an account number for whose benefit the first batch of mail will be imprinted;
    initializing the postage meter a first time by verifying that the postage meter can communicate with and is ready to accept commands from the computing device, obtaining a current postage rate, unparking print heads of the postage meter, starting a motor of the postage meter, starting a feeder of the postage meter, reading a meter value register to track the total postage applied, and resetting a meter batch register to count a number of pieces to be imprinted with postage;
    loading the first batch of mail for the first job into the feeder of the postage meter;
    running the first batch through the postage meter so as to be imprinted with postage, the date, and any text;
    entering into the computing device parameters for imprinting postage on a second batch of mail to be run through the postage meter during a second job while the first batch of mail is being run through the postage meter, said parameters including a selected class of mail, any text to be imprinted with the postage, a date, and an account number for whose benefit the second batch of mail will be imprinted;
    loading the second batch of mail for the second job into the meter feeder of the postage meter; and
    running the second batch of mail through the postage meter to be imprinted with the postage, the date, and any text, subsequent to completion of the first job, without initializing the postage meter a second time.

2. The method for controlling the operation of an automated postage meter recited in claim 1, including the additional step of stopping the postage meter after a batch of mail to be imprinted with postage during a last job of a workday has been run through the meter.

3. The method for controlling the operation of an automated postage meter recited in claim 2, including the additional step of retrieving information from the postage meter after said meter has stopped following the last job, said information representing a count indicated by the meter batch register of a total number of pieces of mail run through the meter to be imprinted with postage during all jobs and a value indicated by the meter value register of the total postage applied during all jobs.

4. The method for controlling the operation of an automated postage meter recited in claim 3, including the additional step of providing an indication to a meter operator of a total number of pieces for each batch of mail run through the postage meter during each job, a total postage applied to each batch of mail during each job, and the respective account numbers to be charged for the postage applied to the batches of mail during each job.

5. The method for controlling the operation of an automated postage meter recited in claim 3, including the additional step of storing the information retrieved from the postage meter after said meter has been stopped following the last job.

6. The method for controlling the operation of an automated postage meter recited in claim 1, including the additional steps of selecting the first job and any additional job following the first job from a list of jobs that are to be completed one after another; and entering into the computing device the parameters for imprinting postage on respective batches of mail for each of the jobs on the list at the same time that the batch of mail for the first job on the list is running through the postage meter and being imprinted with postage.

7. The method for controlling the operation of an automated postage meter recited in claim 6, including the additional step of changing the order in which the jobs on the list of jobs will be completed and the respective batches of mail run through the postage meter to be imprinted with postage.

8. The method of claim 1, further comprising performing said steps of entering, loading, and running for a subsequent third batch of mail.

9. A method for controlling the operation of an automated postage meter by a computing device, said method comprising:
    receiving, by the computing device, parameters for imprinting postage on a first batch of mail to be run through the postage meter during a first job, said parameters including a class of mail, text to be imprinted with the postage, a date, and an account number for whose benefit the first batch of mail will be imprinted;
    initializing the postage meter a first time by verifying that the postage meter can communicate with and is ready to accept commands from the computing device, obtaining a current postage rate, unparking print heads of the postage meter, starting a motor of the postage meter, starting a feeder of the postage meter, reading a meter value register to track the total postage applied, and resetting a meter batch register to count a number of pieces to be imprinted with postage;
    receiving the first batch of mail for the first job in the feeder of the postage meter;
    processing the first batch of mail by the postage meter so as to imprint each item in the first batch with postage, the date, and the received text;
    receiving by the computing device, while the first job is being run through the postage meter, parameters for imprinting postage on a second batch of mail to be run through the meter during a second job, said parameters including a class of mail, text to be imprinted with the postage, a date, and an account number for whose benefit the second batch of mail will be imprinted;

receiving the second batch of mail for the second job in the meter feeder of the postage meter; and running the second batch of mail through the postage meter subsequent to completion of the first job, to be imprinted with the postage, the date, and any text, without initializing the postage meter a second time.

10. The method of claim 9, further comprising performing said steps of entering, loading, and running for a subsequent third batch of mail.

11. The method of claim 9, further comprising stopping the postage meter after a batch of mail to be imprinted with postage during a last job of a workday has been run through the meter.

12. The method of claim 11, further comprising retrieving information from the postage meter after said meter has stopped following the last job, said information representing a count indicated by the meter batch register of a total number of pieces of mail run through the meter to be imprinted with postage during all jobs and a value indicated by the meter value register of the total postage applied during all jobs.

13. The method of claim 12, further comprising storing the information retrieved from the postage meter after said meter has been stopped following the last job.

14. The method of claim 9, further comprising:

selecting the first job and an additional job following the first job from a list of jobs that are to be completed one after another; and entering into the computing device parameters for imprinting postage on respective batches of mail for each of the jobs on the list while the batch of mail for the first job on the list is running through the postage meter and being imprinted with postage.

15. A system comprising:

a processor; and a postage meter controllable by the processor;

said processor configured to perform a method comprising:

receiving, by the computing device, parameters for imprinting postage on a first batch of mail to be run through the postage meter during a first job, said parameters including a class of mail, text to be imprinted with the postage, a date, and an account number for whose benefit the first batch of mail will be imprinted;

initializing the postage meter a first time by verifying that the postage meter can communicate with and is ready to accept commands from the computing device, obtaining a current postage rate, unparking print heads of the postage meter, starting a motor of the postage meter, starting a meter feeder of the postage meter, reading a meter value register to track the total postage applied, resetting a meter batch register to count a number of pieces to be imprinted with postage;

receiving the first batch of mail for the first job in a feeder of the postage meter;

processing the first batch by the postage meter so as to imprint each item in the first batch with postage, the date, and the received text;

receiving by the computing device, while the first batch of mail is being run through the postage meter, parameters for imprinting postage on a second batch of mail to be run through the postage meter during a second job, said parameters including a class of mail, text to be imprinted with the postage, a date, and an account number for whose benefit the second batch of mail will be imprinted;

receiving the second batch of mail for the second job in the meter feeder of the postage meter; and running the second batch of mail through the postage meter, subsequent to completion of the first job, to be imprinted with the postage, the date, and any text, without initializing the postage meter a second time.

16. The system of claim 15, said processor further configured to perform said steps of entering, loading, and running for a subsequent third batch of mail.

17. The system of claim 15, said method further comprising stopping the postage meter after a batch of mail to be imprinted with postage during a last job of a workday has been run through the meter.

18. The system of claim 17, said method further comprising retrieving information from the postage meter after said meter has stopped following the last job, said information representing a count indicated by the meter batch register of a total number of pieces of mail run through the meter to be imprinted with postage during all jobs and a value indicated by the meter value register of the total postage applied during all jobs.

19. The system of claim 18, said method further comprising storing the information retrieved from the postage meter after said meter has been stopped following the last job.

20. The system of claim 15, said method further comprising:

selecting the first job and an additional job following the first job from a list of jobs that are to be completed one after another; and entering into the computing device parameters for imprinting postage on respective batches of mail for each of the jobs on the list while the batch of mail for the first job on the list is running through the postage meter and being imprinted with postage.

* * * * *